(12) United States Patent
N'Guyen et al.

(10) Patent No.: US 9,052,231 B2
(45) Date of Patent: Jun. 9, 2015

(54) BOLOMETRIC DETECTOR OF AN ELECTROMAGNETIC RADIATION IN THE TERAHERTZ RANGE

(71) Applicant: Commissariat A L'Energie Atomique Et Aux Energies Alternatives, Paris (FR)

(72) Inventors: Duy Thong N'Guyen, Fontaine (FR); Jerome Meilhan, Grenoble (FR); Jean-Louis Ouvrier-Buffet, Sevrier (FR); Francois Simoens, Claix (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 76 days.

(21) Appl. No.: 13/687,491

(22) Filed: Nov. 28, 2012

(65) Prior Publication Data

US 2013/0146772 A1 Jun. 13, 2013

(30) Foreign Application Priority Data

Dec. 9, 2011 (FR) ...................................... 11 61425

(51) Int. Cl.
*G01J 5/02* (2006.01)
*G01J 5/00* (2006.01)
(Continued)

(52) U.S. Cl.
CPC . *G01J 5/02* (2013.01); *H01Q 21/24* (2013.01); *G01J 5/24* (2013.01); *G01J 5/0837* (2013.01); *G01J 5/20* (2013.01)

(58) Field of Classification Search
CPC ........... G01J 5/0837; G01J 5/24; H01Q 21/24

USPC ......................................................... 250/349
See application file for complete search history.

(56) References Cited

U.S. PATENT DOCUMENTS 4,814,777 A * 3/1989 Monser .......................... 343/727
6,329,655 B1 12/2001 Jack et al.
(Continued)

FOREIGN PATENT DOCUMENTS

EP 2246677 A1 11/2010
FR 2788129 A 7/2000

OTHER PUBLICATIONS

Chattopadhyay et al., A Dual-Polarized Slot Antenna for Millimeter Waves, May 1998, IEEE Transactions On Antennas and Propagation, vol. 46, No. 5, pp. 7366-7737.*

(Continued)

*Primary Examiner* — David Porta
*Assistant Examiner* — Jeremy S Valentiner
(74) *Attorney, Agent, or Firm* — Harris Beach PLLC

(57) ABSTRACT

A bolometric detector of a terahertz electromagnetic radiation includes at least one bolometric microbridge suspended above a substrate by support and thermal insulation arms, so as to form a cavity between the microbridge and the substrate. The microbridge includes a radiation collection means for collecting the electromagnetic radiation. A resistive means is resistively coupled with the collection means. A thermometric means is thermally coupled with the resistive means. The collection means includes at least one pair of antennas each of the antennas being substantially parallel to the microbridge. A first antenna is capable of collecting the radiation according to a first polarization axis. A second antenna is capable of collecting the radiation according to a second polarization axis, different from the first polarization axis.

12 Claims, 6 Drawing Sheets

(51) Int. Cl.
*H01Q 21/24* (2006.01)
*G01J 5/24* (2006.01)
*G01J 5/08* (2006.01)
*G01J 5/20* (2006.01)

(56) References Cited

U.S. PATENT DOCUMENTS 6,359,596 B1 * 3/2002 Claiborne .................... 343/795
2006/0231761 A1 10/2006 Peytavit et al.
2007/0278407 A1 * 12/2007 Wood et al. ................ 250/341.1
2008/0035847 A1 2/2008 Honda et al.
2010/0276597 A1 * 11/2010 Ouvrier-Buffet ............. 250/349
2012/0091342 A1 * 4/2012 Berger et al. .............. 250/338.4

OTHER PUBLICATIONS

Republique Francaise, Rapport de Recherche Preliminaire, dated Jul. 25, 2012, 2 pgs., French Language (FR 1161425).

* cited by examiner (A-A)

BOLOMETRIC DETECTOR OF AN ELECTROMAGNETIC RADIATION IN THE TERAHERTZ RANGE

CROSS-REFERENCE TO RELATED APPLICATIONS

This application claims the benefit of French Patent Application No. 1161425, filed on Dec. 9, 2011. The entirety of this application is incorporated herein by reference.

The present disclosure relates to bolometric detectors having an antenna, and more specifically to wire or bow-tie antennas, intended for the detection of an electromagnetic radiation in the terahertz range.

The detection in the terahertz range, that is, in the frequency range between 100 gigahertz and 10 terahertz, has many applications.

It is thus possible to mention, without this being a limitation:
  medical diagnosis, for which the detection in the terahertz range provides access to anatomical structure details and to the chemical reactions occurring at their level, which can be provided neither by X rays, nor by ultrasounds;
  the military field and flight safety, with for example the forming of anti-stealth radars or of high-resolution radars enabling to make a discrimination;
  the study and the detection of atmospheric contamination, the observation in submillimetric waves indeed providing significant information as to atmospheric chemistry and thus allowing an unequaled follow-up of atmospheric contaminants, such as for example, nitrogen trioxide, which is difficult to detect with conventional techniques due to its high absorption stripes in far infrared;
  the identification of chemical species, many complex chemical compounds having a signature in the terahertz range which is sufficiently unequivocal to enable to detect them with certainty, such as for example certain explosives and toxic products, certain compounds resulting from the maturating of fruits or again certain compounds originating from industrial combustion;
  the analysis of molecular or atomic phenomena, terahertz spectroscopy enabling to obtain new information as to mechanisms such as photoexcitation, photodissociation, and solvation. The same is true for the analysis of molecular interactions (vibratory states of the molecules or the hydrogen bonds, for example), condensed phase systems, dynamic processes in large molecules, such as peptides and proteins, or the observation of the orientation of polymers with a technique based on the terahertz radiation;
  the study of the properties of materials, such as semiconductors, to non-destructively determine, for example, their mobility, the dynamics of ultra-fast carriers and carrier-phonon interactions, supraconductors, polymers, ceramics, organic materials, and porous materials. Further, materials such as plastics, paper, and textiles are transparent in the terahertz range and, conversely, metals are perfect reflectors and water has a high absorbing power. Thus, the detection in this range is particularly well adapted to the inspection of packaged products or to the real time in situ control of manufacturing processes; and
  wide-band telecommunication, the race for always higher data flow rates, at a terrestrial to level as well as between satellites, urging manufacturers to develop systems operating at frequencies which now reach several hundreds of gigahertz, or even, in a close future, several terahertzes.

BACKGROUND

Usually, a resistive bolometric detector measures the power of an incident radiation in the infrared range. For this purpose, it comprises an absorbing resistive element, which converts the light flow into a heat flow, which generates a temperature rise of said element with respect to a reference temperature. This temperature increase then induces a variation of the electric resistance of the thermometric element, thus causing voltage or current variations thereacross. Such electric variations form the signal delivered by the sensor.

However, the temperature of the absorbing element is usually greatly dependent on its environment, and especially on the temperature of the substrate which comprises the electronic read circuit. To desensitize as much as possible the absorbing element from its environment, and thus increase the detector sensitivity, the absorbing element is generally thermally insulated from the substrate.

FIG. 1 is a simplified perspective view of an elementary resistive bolometric detector 10 of the state of the art illustrating the thermal insulation principle. Such an elementary detector, appearing in the described example in the form of a suspended membrane, conventionally belongs to a one- or two-dimensional array of elementary detectors.

Detector 10 comprises a thin membrane 12 absorbing the incident radiation, suspended above a substrate—support 14 via two conductive anchoring nails 16, having said membrane attached thereto by two thermal insulation arms 18. Membrane 12 usually comprises a stack of a dielectric layer and of a metal layer. The metal layer ensures the absorption function and the dielectric layer electrically insulates the metal layer from the thermometric element.

A thin layer 20 of resistive thermometric material is further deposited at the center of membrane 12, especially a layer made of a semiconductor material, such as highly or weakly resistive polysilicon or amorphous p- or n-type silicon, or a vanadium oxide ($V_2O_5$, $VO_2$) formed in a semiconductor phase.

Finally, substrate—support 14 comprises an electronic circuit integrated on a silicon wafer, usually known as a "read circuit". The read circuit comprises, on the one hand, the excitation and read elements of thermometric element 20, and on the other hand the multiplexing components which enable to serialize the signals originating from the different thermometric elements present in the detector array.

In operation, membrane 12 heats up under the effect of an incident electromagnetic radiation and the generated thermal power is transmitted to thermometric material layer 20. Periodically, the read circuit arranged in substrate 14 biases thermometric element 20 by submitting nails 16 to a bias voltage, and collects the current flowing through thermometric element 20 to deduce therefrom a variation of its resistance, and thus the incident radiation having caused said variation.

For brevity, the arrangement and the operation of such a detector being conventional, it will not be explained in further detail. It should however be noted that membrane 12 fulfils, in addition to the thermal insulation function, three main functions: an antenna function to receive the radiation, a function of conversion of the received electromagnetic power into thermal power, and a function of thermometric measurement of the generated thermal power. Since it is used as an antenna, membrane 12 has dimensions which are accordingly selected to be of the same order of magnitude as the wavelength of the radiation to be measured.

Now, in the terahertz range, wavelengths may reach one millimeter, which thus requires a membrane of the same order of magnitude. However, for such dimensions, the thermal mass, the mechanical hold, and the radiation loss of the membrane are such a problem that, in the end, they adversely affect the detector efficiency. Especially, a large heat capacity induces a high response time of the detector. Reinforcing the mechanical hold is not a satisfactory solution either, since a thick thermal insulation arm negatively affects the thermal insulation, and thus the detector sensitivity.

This is why, for such a frequency range, the radiation reception function is decoupled from the other functions. The receive function is thus provided by a planar antenna, and the function of conversion of the electromagnetic power into thermal power is provided by the resistive load of the antenna. The load dimensions conventionally fulfill the impedance matching conditions, which depend on the geometry of the antenna and on the nature of the layers supporting it, to obtain an optimal conversion. The resistive load is further in thermal contact with a thermometric element for the measurement of the generated thermal power. The assembly then forms a bolometer with an antenna.

Document US 2006/0231761, having its FIGS. 2 and 3a respectively reproduced in FIGS. 2 and 3, describes a bolometer 30 with an antenna, comprising a thermometric element 32 connected to a dipole-type antenna 38 via a resistive load 36. The assembly formed of the antenna, of the load, and of the thermometer is suspended above a substrate 34 by means of thermal insulation arms 39. The incident terahertz flow is thus detected by dipole antenna 38, which converts this flow into hyperfrequency surface currents, the generated currents inducing in return the heating of the resistive load 36, and thus of thermometric element 32.

The type of bolometer with an antenna however has two disadvantages. First, the antenna branches are separated by the bolometer. Now, the absorption efficiency of a bolometer with an antenna is maximum when the impedance of the resistive load is "matched" with the impedance of the antenna. More specifically, the impedance of an antenna comprises a real part, which is the resistance, and an imaginary part, which is the reactance, both variable according to the frequency of the current conducted by the antenna. There is a specific frequency, called "resonance frequency", for which the resistance is maximum and the reactance is zero. The resistive coupling between the antenna and a resistive element, and thus the absorption efficiency of the bolometer, is optimal when the resistance of the resistive element is selected to be equal to the resistance of the antenna for the resonance frequency, or generally a resistance value at the resonance frequency ranging between 100 and 300 ohms.

Now, in the above-described architecture, the resistive load is itself coupled with the thermometric element, so that the general resistive element "seen" by the antenna is the combination of the resistive load and of the bolometer. In this case, a bolometer having a resistance "compatible" with the resistance of the antenna should thus be provided. However, bolometric materials efficient for thermometric detection at ambient temperature usually have a resistance greater than some hundred k$\Omega$, or even greater than one M$\Omega$, so that their impedance matching with the antenna is very low. Further, even though a bolometer (for example, of supraconductive type) would have a resistance "compatible" with that of the antenna, the very principle of a bolometer is to see its resistance vary along with temperature. Accordingly, for the very definition of the bolometer, it is impossible to have an optimal impedance matching for all temperatures observed with this type of architecture.

Another disadvantage resulting from this architecture is that it detects a radiation according to a single polarization axis, and that it is accordingly very sensitive to the polarization of the incident radiation. To detect an incident radiation of any polarization, at least two different polarization axes, advantageously orthogonal, should thus be defined. Now, the integration of a second dipole antenna, having a polarization axis different from that of the first antenna, in the bolometer with an antenna of document US 2006/0231761 is very difficult without strongly altering the detector performance, due to the presence of the thermal insulation arms.

Usually, two categories of antennas are used to obtain a bipolar detection, that is, on the one hand, circular polarization antennas, such as for example spiral antennas, and on the other hand, a system of two crossed antennas respectively sensitive to two orthogonal rectilinear polarizations, such as double bowties or double dipoles.

For the second category, to obtain an equal detection according to the two polarization axes, the crossed antennas should be symmetrical for the two orthogonal polarizations, which means that the physical size of the antennas should be identical whatever the polarization.

Now, this is difficult with a bolometric membrane such as described in relation with FIG. 1. Indeed, under the assumption that the antennas are placed on the suspended membrane, thermal arms 18, which thermally insulate the antennas and the thermometric element, impose a limit to the geometric length of the antenna in one of the two polarization directions since the antenna must not cross the two thermal insulation arms, which would very negatively affect the thermal insulation. Also, this symmetry constraint for the dipole antenna imposes a maximum size of the antenna equal to the distance between the two thermal arms. Such a technological approach thus adversely affects the advantage of forming a bolometric detector where a large antenna for coupling the submillimetric wave is associated with a small bolometric membrane. Indeed, the physical size of the antenna is always smaller than the size of the bolometric plate. Such a situation is incompatible with a detection in the spectral range, which requires large antennas for an efficient coupling.

To overcome the size limitation imposed by the thermal insulation arms, a solution is to transfer at least one of the antennas outside of the suspended membrane, for example, on the support above which the latter is suspended, and to provide a coupling mechanism which transfers the electromagnetic power received by the transferred antenna(s) to the suspended membrane by a capacitive coupling mechanism.

Such a solution is for example described in document US 2010/276597. Referring to FIGS. 4 and 5, this document describes a bolometer 40 which comprises an insulating substrate 42 having a first bowtie antenna 56 deposited thereon. A microbridge 50 is suspended above 10 substrate 42 by support and thermal insulation arms 54. A second bowtie antenna 44, crossed with first antenna 56, is further formed on microbridge 50 and is resistively coupled with a conductive layer 66 thereof. Fins 68, 70, 72, made of the same material as antenna 44 are also provided on conductive layer 66 with surfaces facing first bowtie antenna 56. Fins 68, 70, 72 are thus capacitively coupled with first bowtie antenna 56. A thermometric material 15 layer 74 is further deposited on an insulator layer 76 in contact with conductive layer 66.

A portion of the incident optical flow is thus collected by transferred antenna 56, which generates surface currents therein. By capacitive effect, the surface currents couple with fins 68, 70, 72. The latter thus form first antennas in microbridge 50.

However, capacitive coupling has, by nature, a lower performance than a resistive coupling, due to a lack of optimal matching. Indeed, when using a capacitive coupling between a "primary" transferred antenna and a "secondary" antenna in the microbridge, the value of the capacitance formed between the primary and secondary antennas adds to the reactance of the primary antenna. Since this reactance is no longer zero at the resonance frequency, the capacitive coupling has a lower performance than a resistive coupling with an matched impedance load. Further, since the capacitance of the capacitive coupling between primary antenna 56 and secondary antennas 68, 70, 72 varies according to frequency, the capacitance decreasing according to frequency, the impedance matching is not constant, and especially alters as the frequency decreases.

Another disadvantage of capacitive coupling is that it requires a large surface area of the antenna to have a certain efficiency. Indeed, the intensity of the capacitive coupling is proportional to the opposite metal surface areas, which thus implies significantly increasing the thermal mass of the microbridge and accordingly adversely affecting the detector response time.

SUMMARY

The present invention aims at providing a detector in the terahertz range based on bolometers with antennas, capable of performing a detection according to two polarization axes without requiring capacitive coupling.

For this purpose, the present invention aims at a bolometric detector of a terahertz electromagnetic radiation, comprising at least one bolometric microbridge suspended above a support by support and thermal insulation arms, the microbridge comprising:
   radiation collection means for collecting the electromagnetic radiation;
   resistive means, resistively coupled with the collection means, for converting the electromagnetic power collected by said collection means into thermal power; and
   thermometric means, thermally coupled with the resistive means, for heating up under the effect of the thermal power that they have generated.
According to the present invention:
   the collection means comprise at least one pair of antennas having:
      a first antenna capable of collecting the radiation according to a first polarization axis; and
      a second antenna capable of collecting the radiation according to a second polarization axis, different from the first polarization axis;
   the resistive means comprise an individual resistive load resistively coupled with each antenna;
   and the thermometric means are electrically insulated from the collection means and from the resistive means.

In other words, the antennas are each resistively coupled with a resistive load which is electrically insulated from the thermometric element. Since the thermometric element is electrically insulated from an antenna and from its load, the hyperfrequency current induced by the absorption of the radiation is only limited thereto, so that the impedance matching is only achieved between the impedance of the antenna and the resistance of the resistive load, with no influence of that of the thermometric element. Since a resistance ranging between 100 and 300 ohms can be formed, for example by appropriately sizing the load, the impedance matching can be optimal for each antenna. As a result, in particular, the resistance variation of the thermometer has no effect on the operation of the antenna since the thermometer is electrically insulated from the antenna by an insulator layer.

According to an embodiment, the first and the second antennas are wire dipole-type antennas.

Wire antennas are well known in the art. Term "wire antenna" generally designates a thin elongated element of substantially constant cross-section, especially made in the form of a to substantially rectilinear strip or of a bar, for example, of rectangular cross-section.

According to an embodiment, the first and the second antennas are in electric contact with each other, which enables to increase the electric length of each of the antennas by modifying the electric impedance of each of them.

According to an embodiment, the first and the second antennas each comprise two portions in contact with a resistive load. More specifically, the antennas are dipolar, for example, of wire or bowtie type.

According to an embodiment, each resistive load has a resistance value substantially equal to the value of the impedance of the antenna to which it is coupled for a resonance frequency of the antenna, so that an optimal impedance matching is achieved for each antenna.

According to an embodiment, the lengths of the first and second antennas along their respective polarization axes are substantially equal.

According to an embodiment, the microbridge comprises a membrane suspended above the support by said arms, and at least one antenna having a polarization axis which does not cross the thermal insulation arms comprises a portion extending outside of said membrane. Thus, the lengths of the first and second antennas along their respective polarization axis are not equal. The antenna which extends outside of the suspended membrane thus has a greater length than that of the antenna entirely supported by the membrane.

According to an embodiment, the first and the second antennas are each deposited on a resistive layer, an antenna and the resistive layer on which it is deposited being encapsulated in an electrically-insulating material, and the thermometric means comprise a thermometric material element deposited on the insulating encapsulation material.

According to an embodiment, the microbridge comprises two pairs of antennas.

According to an embodiment, the first and second polarization axes are perpendicular.

The foregoing and other features and advantages of the present invention will be discussed in detail in the following non-limiting description of specific embodiments in connection with the accompanying drawings, where the same reference numerals designate the same or similar elements.

DETAILED DESCRIPTION

Figure 1:
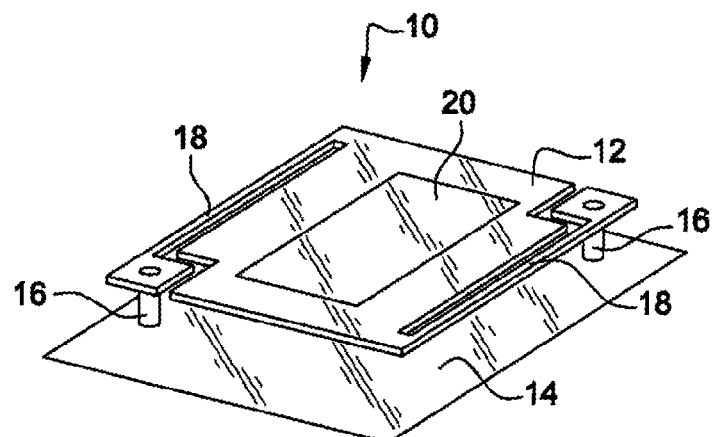
FIG. 1 is a simplified perspective view of an elementary bolometric detector of the state of the art, already described hereabove.
Figure 2:
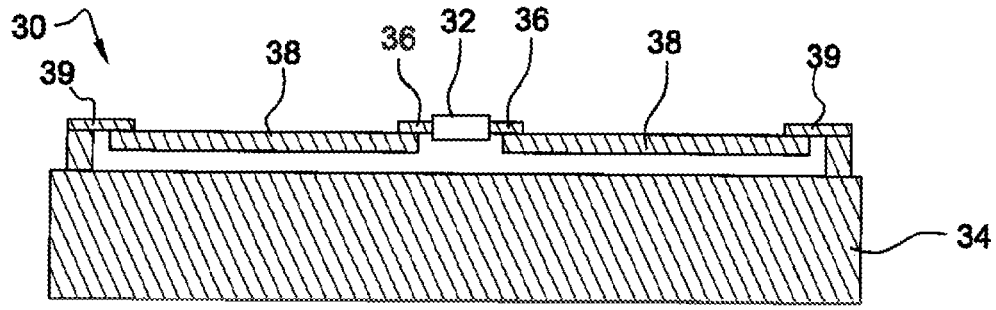
FIGS. 2 and 3 are respective simplified cross-section and top views of the antennas of a bolometer with antennas according to the state of the art, already described hereabove.
Figure 3:
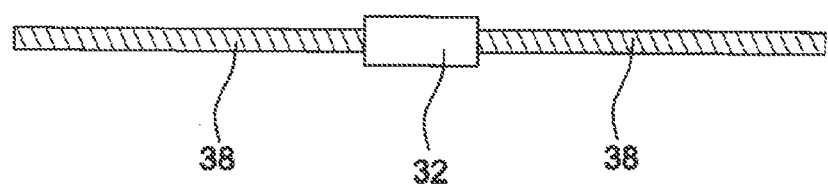
Figure 4:
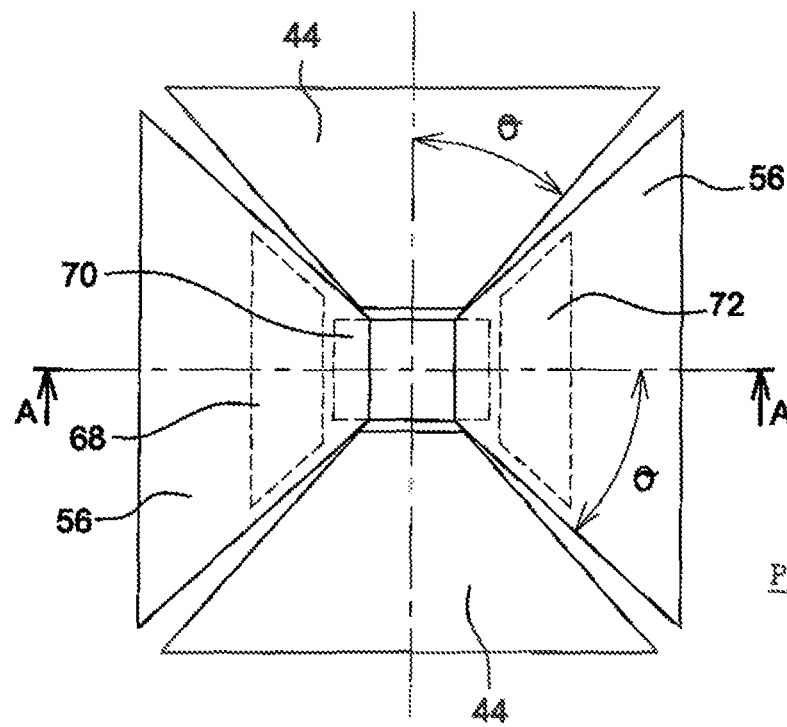
FIG. 4 is a simplified top view of the antennas of a bolometer with antennas according to the state of the art, already described hereabove.
Figure 5:
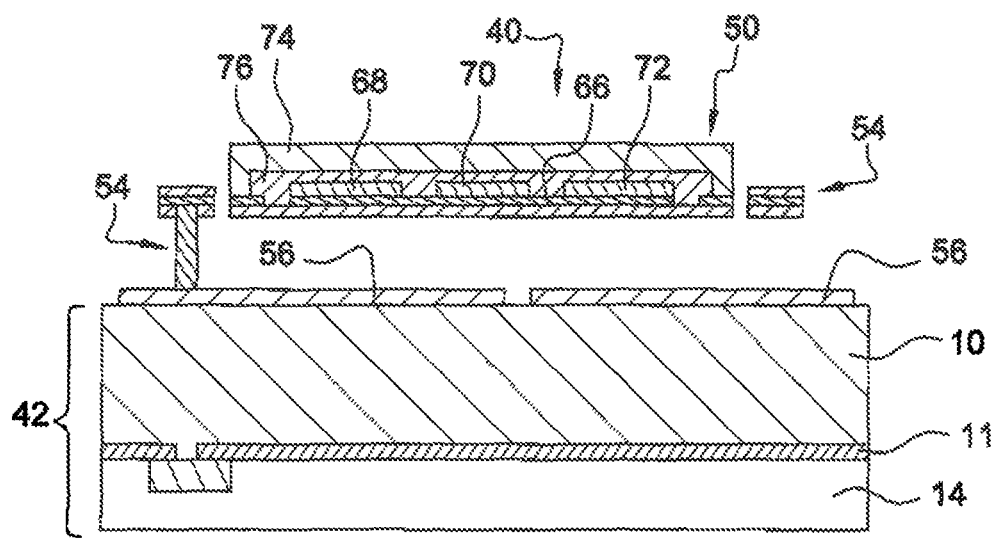
FIG. 5 is a simplified cross-section view of the state-of-the-art bolometer with an antenna of FIG. 4, along plane A-A thereof.
Figure 6:
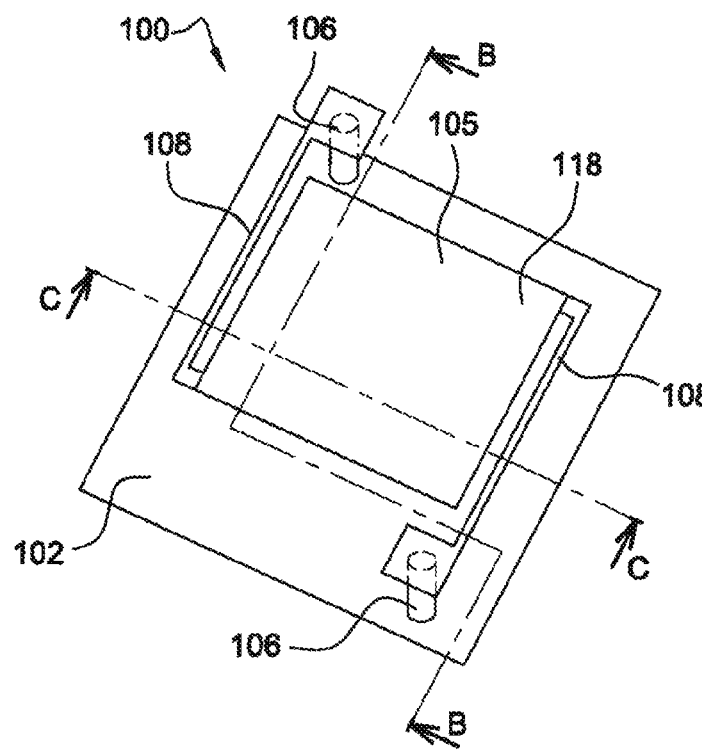
FIG. 6 is a simplified perspective view of a bolometer with an antenna according to the present invention.
Figure 7:
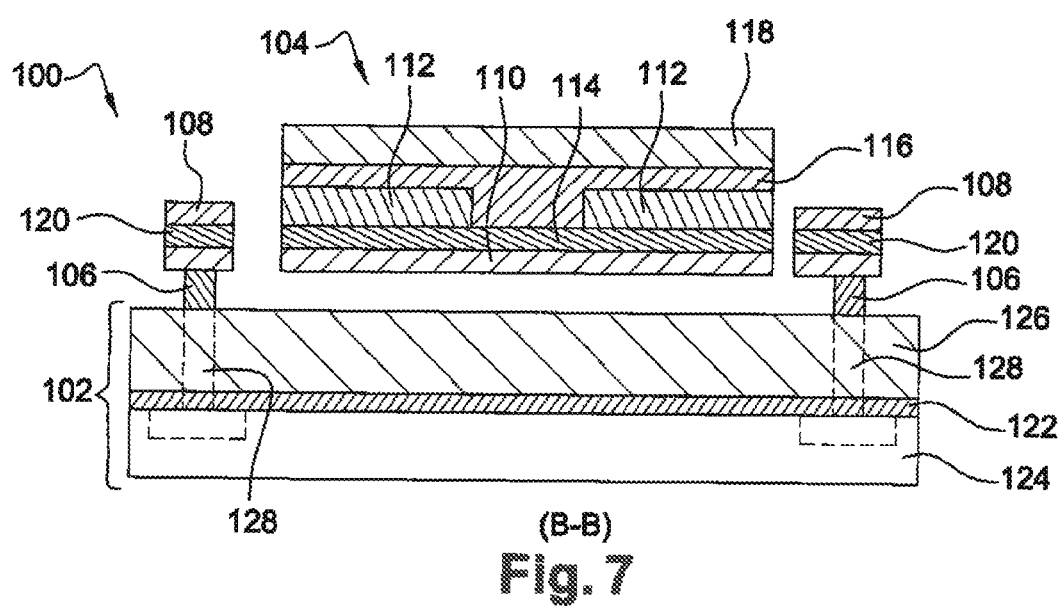
FIGS. 7 and 8 are simplified cross-section views of the detector of FIG. 6, respectively corresponding to cross-sections along planes B-B and C-C of FIG. 6.
Figure 8:
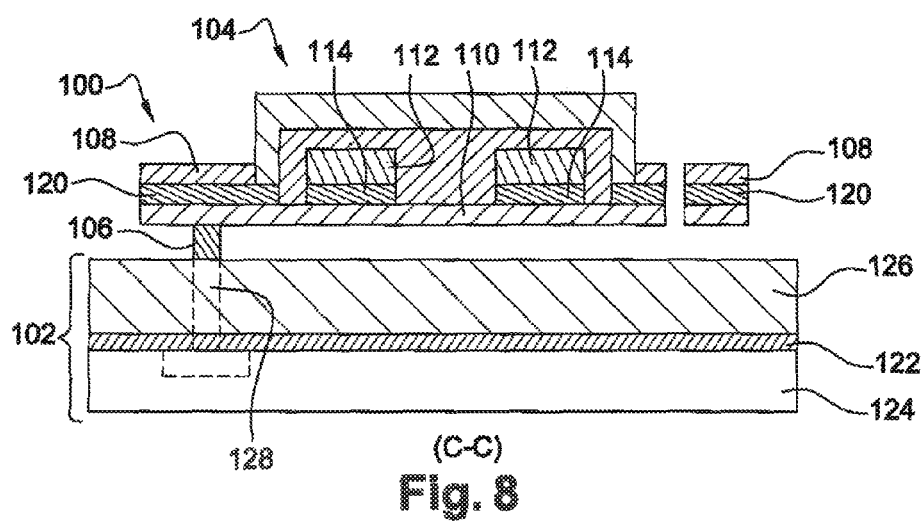

FIGS. 6 to 8 illustrate an elementary bolometric detector 100 according to the present invention, forming part of an array of elementary detectors, for detection in a terahertz radiation range.

Bolometer 100 comprises a support 102 and a microbridge 104 suspended above support 102 by two conductive anchoring nails 106.

Microbridge 104 is formed of a central portion 105 and of two thermal insulation and electric conduction arms 108, connecting central portion 105 to anchoring nails 106. Microbridge 104 comprises a first layer 110 of electric insulator, such as, for example, SiO$_2$, SiO, SiN, ZnS or others, of a thickness for example ranging between 0.5 nanometer and 0.5 micrometer. Layer 110 ensures the mechanical stiffness of microbridge 104. In central portion 105 of microbridge 104, layer 110 supports a set of antennas 112 for receiving the electromagnetic radiation according to at least two different polarizations, as well as a set of individual resistive loads 114 for converting the electromagnetic power received by the antennas into thermal power.

More specifically, individual resistive loads 114 are made in the form of metal patterns distinct from one another, advantageously etched in a layer having a thickness ranging between 5 nanometers and 50 nanometers, for example, made of Ti, TiN, Pt, Ni Cr, or others, deposited on layer 100 of electric insulator layer 110. Antennas 112 are in contact with these patterns, have a thickness ranging between 100 nanometers and 500 nanometers, preferably thicker than the skin depth of the material at the operating frequency, and are for example formed of aluminum, tungsten silicide, titanium, or others. Of course, resistive loads 114 should be in contact with antennas 112, the stacking order being of no importance. Thus, the antennas may be deposited on resistive loads 114 or conversely.

Figures 9, 10:
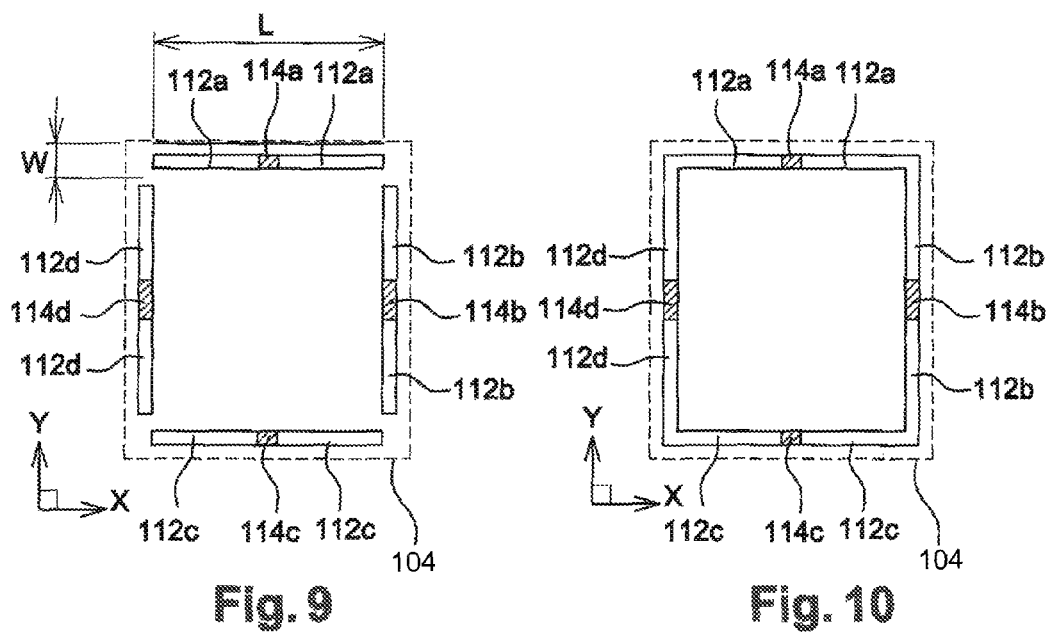
FIGS. 9, 10, and 11 are simplified top views of different variations of antennas and of resistive loads comprised in the bolometer with an antenna according to the present invention.

FIG. 9 illustrates a first variation, in top view, of antennas and of their respective resistive loads. Four identical distinct dipole antennas 112a-112d, in the form of strips or of bars, are provided, for example, at the border of central portion 105 of microbridge 104, two antennas 112a, 112c being arranged along a first polarization axis X and the two other antennas 112b, 112d being arranged along a second polarization axis Y, orthogonal to first axis X. Each of antennas 112a-112d comprises two branches formed on an individual resistive load 114a-114d, for example, made in the form of a metal strip, having its dimension selected to achieve an optimal impedance matching with its respective antenna, that is, having dimensions selected for the resistance of the resistive load to be substantially equal to the resistance of the antenna at the resonance frequency thereof. Only the portion of individual load 114a-114d substantially located between the two branches of the dipole antenna determines the resistance of this load.

More specifically, sheet resistance R$_s$ of a load is essentially determined by its thickness, and this value combined with the load size determines the load resistance value, approximately ranging from 50 to 200 ohms. For a rectangular resistive load of length L and of width W, resistance R of the resistive load is equal to:

$$R = R_S \frac{L}{W}$$

Referring again to FIGS. 6 to 8, microbridge 104 comprises a second electric insulator layer 116, for example, a SiN, SiO, or ZnS layer, having a thickness ranging between 5 nanometers and 100 nanometers, deposited on antennas 112 and resistive loads 114, as well as a bolometric material layer 118 deposited on second electric insulator layer 116 and in electric contact with a conductive layer 120 of thermal insulation arms 108. Antennas 112 and resistive loads 114 are thus encapsulated in insulating material 110, 116 and electrically insulated from bolometric material 118.

The bolometric material for example is an amorphous or polycrystalline semiconductor, such as Si, Ge, SiC, a-Si:H, a-SiGe:H, a metallic material, or again a vanadium oxide or a magnetite oxide. This material must have a non-zero temperature coefficient resistance (TCR). In other words, its resistance varies according to temperature.

Support 102 comprises a reflector 122, arranged on a read circuit 124, such as for example an aluminum layer, and an insulating material layer 126, advantageously having the lowest possible absorption coefficient in the operating wavelength of the detector, for example, a layer of SiO, SiO$_2$, SiN, Ta$_2$O$_5$, Ta$_2$O$_5$-TiO$_2$, HfO$_2$, SrTiO$_3$, Ba$_{1-x}$Sr$_x$TiO$_3$, or of a mixture thereof. Layer 126 further has a thickness e set to the following value:

$$e = \frac{\lambda}{4n}$$

where:

λ is a wavelength from the detector operating range, for example, the central wavelength of this range; and
n=$\sqrt{\in}$, $\in$ being the dielectric permittivity of the material forming layer 126.

A resonant cavity is thus obtained for the terahertz radiation to be detected. Layer 126 is further crossed by electric connections 128, in line with conductive anchoring nails 106, to electrically connect read circuit 124 and thermometric element 118.

FIG. 10 illustrates a second variation of antennas and of their respective resistive loads. In this variation, each branch of an antenna along a polarization axis is in electric contact with the adjacent branch of an antenna associated with the other polarization axis. This enables to increase the electric length of each antenna.

Figure 11:
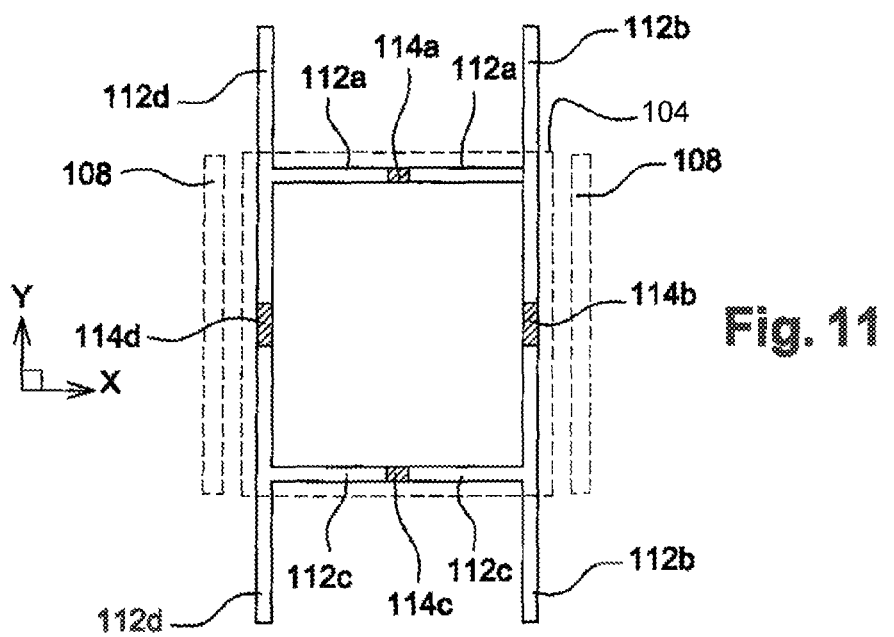

FIG. 11 illustrates a third variation similar to the second variation, with the difference that to antennas 112b, 112d are parallel to thermal insulation arms 108 which extend beyond suspended central portion 105.

In this direction, the length of antennas 112b, 112d is not limited by the two thermal arms 108. Especially, antennas 112b, 112d may thus protrude from bolometric plate 108 and be 15 suspended above support 102. Detection wavelength Λ of antennas 112b, 112d, and thus of the detector, according to polarization Y is then set by geometric length L of antennas 112b, 112d according to relation A=2×L.

In direction X orthogonal to thermal insulation arms 108, said arms limit the geometric length of antennas 112a, 112c, since the antennas must not cross arms 108 to avoid adversely affecting the thermal insulation.

With the configuration provided in the second and third variations, dipole antennas 112a, 112c see their equivalent electric length lengthened by the branches of perpendicular antennas 112b, 112d in contact with them. Such an increase of the electric length of antennas 112a, 112c enables to adjust the resonance frequency of antennas 112a, 112c identically to that of antennas 112b, 112d. Thus, for example, the geometric length of antennas 112a, 112c may be shorter than that of antennas 112b, 112d while the operating wavelength of the antennas is identical. The detector thus has an identical sensitivity for the two orthogonal polarizations.

The advantage of this detector is that it thus enables to capture the incident flow according to the two polarizations while keeping a good performance despite the limitation induced by the presence of the thermal insulation arms. It is possible to detect low-frequency waves without adding thermal mass and thus without altering the detector response time. Indeed, the long antenna necessary for low frequencies can be thin and geometrically protrude from the bolometric plate, which remains of small size and accordingly has a reasonable thermal capacity.

In terms of electromagnetic absorption, for each polarization, such a configuration is equivalent to dipoles arranged in parallel, distant by one third of the pixel size or pitch. When the pixels are integrated in the form of a two-dimensional focal plane array, the antennas are then distributed more densely and uniformly than in the conventional case of a bowtie antenna, so that the effective optical filling rate is higher. Such a phenomenon enables this antenna configuration to obtain a very wide band spectral absorption.

An additional advantage is that the absorption rate of the detector in the infrared spectral range is low. The absorption in infrared is proportional to the size of the resistive loads, which are very small as compared with the detector surface area.

A method for manufacturing the detector which has just been described will now be described in relation with FIGS. 12 to 16.

Figure 12:
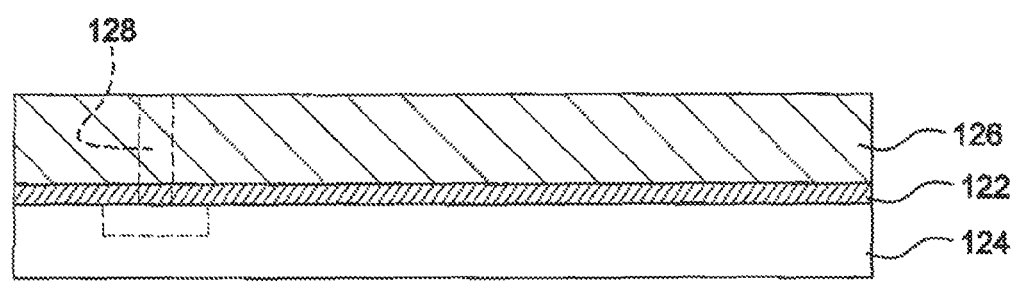
FIGS. 12 to 16 are cross-section views along plane C-C of FIG. 6, illustrating a method for manufacturing a bolometer according to the present invention.

As illustrated in FIG. 12, a reflector assembly 122, 126 of the detector is formed of reflector 122, arranged on read circuit 124, such as for example an aluminum layer, and of insulating material layer 126. Layer 126 is further crossed by electric connections 128, in line with anchoring nails 106, to electrically connect read circuit 124 and thermometric element 118. For example, vias are formed in layer 126 according to a usual technique, and the vias thus formed are filled with a metal such as tungsten, aluminum, or copper by means of a damascene technology associated with a planarization technique. The reflector assembly forms a resonant cavity with antennas 112.

Figure 13:
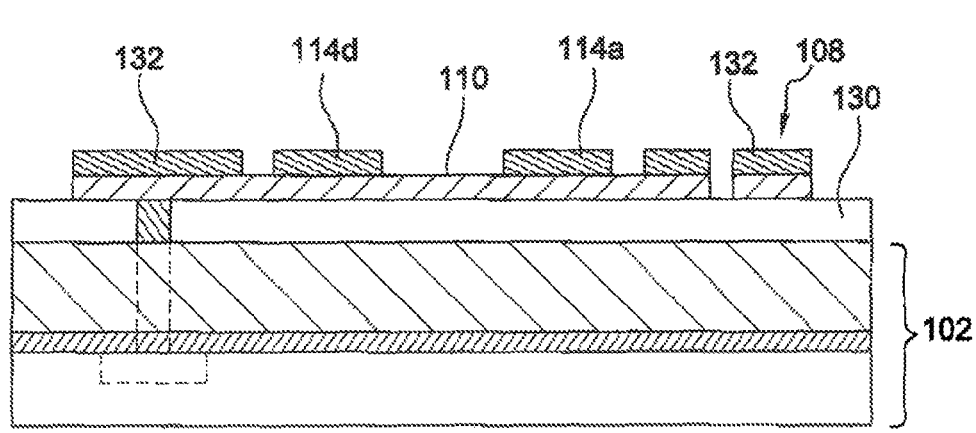
Figure 14:
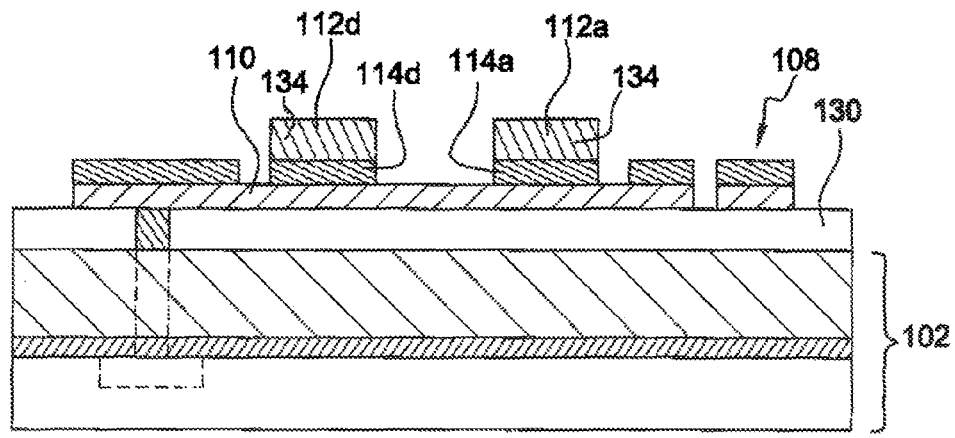

Referring to FIG. 13, once support 102 has been manufactured, a sacrificial layer 130, for example, made of polyimide, having a thickness ranging between 0.5 micrometer and 5 micrometers is formed on layer 126, and is used as a support for the manufacturing of microbridge 104. The thickness of sacrificial layer 130 is selected to provide both a good mechanical hold of the microbridge structure and an efficient thermal insulation of the microbridge with respect to support 102. In particular, if the thickness is too small, an antenna protruding from the membrane, such as previously illustrated in FIG. 11, may touch layer 126 once sacrificial layer 130 has been removed, which would result in very negatively affecting the thermal insulation between microbridge 104 and support 102. Anchoring nails 106 are further formed in line with vias 128 according to a usual technique.

Insulator layer 110 is then deposited on sacrificial layer 130, after which a thin metal film 132, for example formed of Ti, TiN, Pt, NiCr or others, is deposited on insulator layer 110. Layer 132 has a low thermal conduction due to its small thickness. Insulating layer 110 and thin film 132, each having a thickness ranging between 0.005 micrometer and 0.05 micrometer, are preferably deposited by PECVD (Plasma-Enhanced Chemical Vapor Deposition) or cathode sputtering.

Insulator layer 110 and thin film 132 are then etched, chemically or with a plasma, to form resistive loads 114a-114b and thermal insulation arms 108. Thin film 132 is thus used to form both said loads and the conductive layer of arms 108.

Referring again to FIG. 14, for the forming of antennas 112a-112d, a layer 134 of conductive material, for example, aluminum, tungsten silicide, titanium, or others, having a to thickness ranging between 0.1 micrometer and 0.5 micrometer, is deposited on central portion 105 of metal film 132 by cathode sputtering of by low-pressure chemical vapor deposition (LPCVD) or plasma-enhanced chemical vapor deposition (PECVD), after which the antennas are formed by chemical etching, plasma etching, or by a technique of lift-off type applied to said layer. As a variation, the antennas are formed of metallic multilayers.

Figure 15:
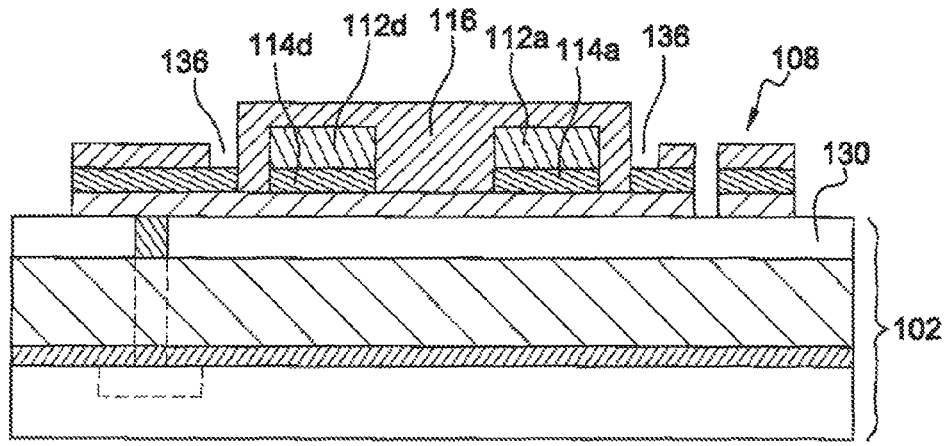

Now referring to FIG. 15, antennas 112a-112d and resistive loads 114a-114d are then covered with a layer 116 of insulating material such as SiN, SiO, ZnS or others. Layer 116, having a thickness ranging between 0.005 micrometer and 0.1 micrometer, is formed to electrically insulate the antennas and the resistive loads from thermometric element 118. Layer 116 is for example formed by means of a low-temperature deposition technique such as cathode sputtering or plasma-enhanced vapor deposition (PECVD). Layer 116 is then etched, for example, chemically or by plasma, to expose lateral portions 136 of metal film 132 to which thermometric element 118 will be connected, as well as thermal insulation arms 108.

Figure 16:
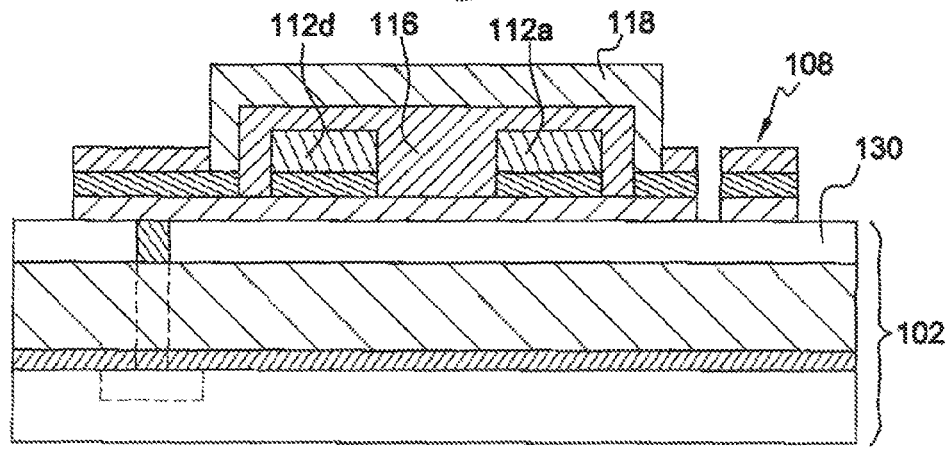

Referring to FIG. 16, thermometric element 118 is then deposited on layer 116 and lateral portions 136, for example by means of a low-temperature deposition technique such as a sputtering.

Finally, sacrificial layer 130 is removed, its nature determining the removal technique, preferably by chemical or plasma etching.

As can be observed, the etching of the materials forming the detector according to the present invention is mainly or exclusively performed by chemical etch techniques, which may be plasma enhanced, such techniques providing accurate and reproducible etchings.

Wire-type separate or connected dipole antennas, of a substantially constant cross-section, and especially their width, for example made in the form of strips or of rectilinear bars, have been described. Bowtie-type dipole antennas may be used. Such antennas comprise two branches, each having a width increasing along with the distance from the other with an angle of opening preferably ranging between 10° and 30°.

The inventors have observed that the density of the antenna on the focal plane has a great influence on the detector absorption rate. The configurations described hereabove use two dipole antennas in a unit detection element, or "pixel", for each polarization, the distance to between two dipoles being on the order of half the pixel "pitch", which is sufficient to provide an equivalent reception surface area of the detector while keeping a reasonable heat capacity of the detector. The inventors have further observed that the use of three dipoles or more by polarization does not substantially increase the absorption rate while it however strongly penalizes the heat capacity of the suspended structure.

As a numerical example, the size of a microbridge, and thus the value of the pixel pitch of a detector array based on such microbridges, ranges between 20 micrometers and 200 micrometers, the geometric length of the antennas parallel to the thermal insulation arms ranges between 20 micrometers and 200 micrometers, and the geometric length of the antennas perpendicular to the thermal insulation arms ranges between 10 micrometers and 70 micrometers.

The present invention especially allows a first detection in the range from 3 terahertz to 10 terahertz, especially by the detector described in relation with FIGS. 9 and 10, and a second detection in the range from 0.3 terahertz to 6 terahertz, especially by the detector described in relation with FIG. 11.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A bolometric detector of a terahertz electromagnetic radiation, comprising:
   at least one bolometric microbridge suspended above a substrate by support and thermal insulation arms, so as to form a cavity between the microbridge and the substrate, the microbridge comprising:
   radiation collection means for collecting the terahertz electromagnetic radiation;
   resistive means, resistively coupled with the collection means, for converting the electromagnetic power collected by said collection means into thermal power; and
   thermometric means, thermally coupled with the resistive means, for heating up under the effect of the thermal power that they have generated,
   wherein the collection means comprise at least one pair of antennas each of said antennas being substantially parallel to the microbridge, having:
      a first antenna capable of collecting the radiation according to a first polarization axis; and
      a second antenna capable of collecting the radiation according to a second polarization axis, different from the first polarization axis;
   wherein the resistive means comprise an individual resistive load resistively coupled with each antenna;
   and wherein the thermometric means are electrically insulated from the collection means and from the resistive means.

2. The bolometric detector of claim 1, wherein the first antenna and the second antenna are antennas of wire dipole type.

3. The bolometric detector of claim 1, wherein the first antenna and the second antenna are in electric contact with each other.

4. The bolometric detector of claim 1, wherein the first antenna and the second antenna each comprise two portions in contact with a resistive load.

5. The bolometric detector of claim 1, wherein each resistive load has a resistance value substantially equal to the value of the impedance of the antenna to which it is coupled for a resonance frequency of the antenna.

6. The bolometric detector of claim 1, wherein the lengths of the first and second antennas along their respective polarization axes are substantially equal.

7. The bolometric detector of claim 1, wherein the microbridge comprises a membrane suspended above the substrate by said arms, and wherein at least one antenna has a polarization axis which does not cross the thermal insulation arms, and wherein said at least one antenna comprises a portion extending outside of said membrane.

8. The bolometric detector of claim 1, wherein the first and the second antennas are each to deposited on a resistive layer, an antenna and the resistive layer on which it is deposited being encapsulated in an electrically-insulating material, and wherein the thermometric means comprise a thermometric material element deposited on the insulating encapsulation material.

9. The bolometric detector of claim 1, wherein the microbridge comprises two pairs of antennas.

10. The bolometric detector of claim 1, wherein the first and second polarization axes are perpendicular.

11. A bolometric detector of a terahertz electromagnetic radiation, comprising a substrate and at least one bolometric microbridge having a membrane, anchoring nails attached to the substrate and extending therefrom and thermal insulation arms respectively attached to the anchoring nails and the membrane, said thermal insulation arms being coplanar with the membrane, the membrane comprising:
   radiation collection means for collecting the electromagnetic radiation;
   resistive means, resistively coupled with the collection means, for converting the electromagnetic power collected by said collection means into thermal power; and
   thermometric means, thermally coupled with the resistive means, for heating up under the effect of the thermal power that they have generated,
   wherein the collection means comprise at least one pair of antennas having:
      a first wire dipole type antenna capable of collecting the radiation according to a first polarization axis and having a first and a second elongated portions collinear with the first polarization axis; and
      a second wire dipole type antenna capable of collecting the radiation according to a second polarization axis, different from the first polarization axis, and having a first and a second elongated portions collinear with the second polarization axis;
   wherein the resistive means comprise an individual resistive load resistively coupled with each of the first and second antenna, said individual resistive load being located in-between the first and second elongated portions of said antenna and in contact therewith;
   wherein the first elongated portions of the first antenna is in contact with the first elongated portion of the second antenna;
   wherein the thermometric means are electrically insulated from the collection means and from the resistive means.

12. A bolometric detector of a terahertz electromagnetic radiation, comprising:
   a substrate and at least one bolometric microbridge having a membrane, anchoring nails attached to the substrate and extending therefrom and thermal insulation arms respectively attached to the anchoring nails and the membrane, said thermal insulation arms being coplanar with the membrane, the membrane comprising:
   radiation collection means for collecting the electromagnetic radiation;
   resistive means, resistively coupled with the collection means, for converting the electromagnetic power collected by said collection means into thermal power; and thermometric means, thermally coupled with the resistive means, for heating up under the effect of the thermal power that they have generated,
wherein the collection means comprise at least one pair of antennas having:
  a first wire dipole type antenna capable of collecting the radiation according to a first polarization axis which does not cross the thermal insulation arms; and
  a second wire dipole type antenna capable of collecting the radiation according to a second polarization axis, different from the first polarization axis;
wherein the resistive means comprise an individual resistive load resistively coupled with each of the first and second antenna;
wherein the thermometric means are electrically insulated from the collection means and from the resistive means; and
wherein the first antenna comprises a portion extending outside the membrane.

* * * * *